United States Patent [19]
Slater et al.

[11] Patent Number: 6,008,492
[45] Date of Patent: Dec. 28, 1999

[54] HYPERSPECTRAL IMAGING METHOD AND APPARATUS

[76] Inventors: Mark Slater, 3620 Bell Ave., Manhattan Beach, Calif. 90266; Robert Bruce Herrick, 28825 Doverridge Dr., Rancho Palos Verdes, Calif. 90275

[21] Appl. No.: 08/735,612

[22] Filed: Oct. 23, 1996

[51] Int. Cl.[6] .................................................. G01J 3/50
[52] U.S. Cl. ......................... 250/334; 250/347; 250/348
[58] Field of Search .................................... 250/334, 348, 250/347

[56] References Cited

U.S. PATENT DOCUMENTS

| | | | |
|---|---|---|---|
| 5,276,321 | 1/1994 | Chang et al. | 250/226 |
| 5,329,595 | 7/1994 | Davies | 382/17 |
| 5,471,056 | 11/1995 | Prelat | 250/253 |
| 5,479,255 | 12/1995 | Denny et al. | 356/319 |

*Primary Examiner*—Constantine Hannaher
*Attorney, Agent, or Firm*—Rabin & Champagne, P.C.

[57] ABSTRACT

The Hyperspectral Imaging Method and Apparatus provides the means of locating materials of economic and military value and accurately determining their spatial location and extent. The identification of a material is made by comparing its surface spectral reflectance properties in a scene with a set of reference template spectra. If there is enough spectral difference between materials of interest such as, for example, camouflage and vegetation or healthy and blighted corn, a detection will be made. The determination of spatial location and extent is may by the rapid collection of spectral measurements (nominally tens of thousands per second) in the form of an image and the reference of this image with GPS position to very high accuracy. Target identification and geolocation is computed in near realtime or realtime.

19 Claims, 5 Drawing Sheets

HYPERSPECTRAL IMAGING METHOD AND APPARATUS

FIELD OF THE INVENTION

The present invention relates generally to an airborne system for providing and exploiting accurately geo-referenced hyperspectral digital imagery in near realtime and realtime. In particular, the present invention provides a means of simultaneously collecting digital imagery over a large number of narrow spectral bands, and associating the data with accurately known geographic positions by using high quality anti-reflection coated refractive optics and elements. A GPS/Differential beacon receiving system with associated antennas, a gyro stabilization system for accurate correction of aircraft roll induced errors and associated processing hardware and software allow the imaging and geo-locating to occur in near realtime or realtime.

BACKGROUND OF THE INVENTION

Hyperspectral imaging is one of the most promising new remote sensing technologies emerging from the laboratory in recent years. This technology involves the use of imaging spectrometers to remotely measure two dimensional variations in surface spectral reflectivity of an area of interest. These spectral measurements are compared against a known set of template or reference spectra.

Traditional single or multispectral systems tend to rely on spatial techniques which often are not satisfactory when performed automatically. In view of this, highly trained and alert human interpreters are often required. As an example, consider the case of a reconnaissance system being flown over a forest in an attempt to detect camouflaged tanks. A single or multispectral system would need sufficient resolution to obtain texture and shape information. Further, the processor or human operator would need to search the scene subregion by subregion looking for a partially obscured rectangle in an arbitrary orientation with the right texture.

It is apparent from recent experimental projects involving imaging spectrometers that spectrometers will play an important role in the future of remote sensing. For instance, these spectrometers will be able to provide the necessary digital spectral imaging crucial for accurate geological, geographic, and environmental surveys, extent of pollution and blighted crops. Thus, present day spectrometers, as they become cheaper and easier to operate, will become useful for measuring forestation, population growth, and other geographic targets.

In order to accurately measure geographic targets, such as hydrological, agricultural or ecological surveys in an economically feasible manner, operation of current spectrometers must be simplified and made more robust and, as important, these systems must be made significantly less expensive. This is because current spectrometers are optimized for controlled laboratory use and do not provide the required ease of use, reliability and flexibility for spectral digital imaging as a stand alone field unit system. Many of these imaging spectrometers are actually used for various specific chemical or research applications to simultaneously acquire only several spectra. Such limited spectral sensing is not useful for widespread geographic coverage.

Imaging spectrometers fall within one of two categories (1) those that look simultaneously at the target in a number of specific wavelength intervals, and (2) those which repetitively scan a given wavelength interval. Such scanners are known as spectral range spectrometers. Spectrometers are further categorized according to their spectral sorting capabilities, i.e., conventional and interferometric spectrometers, wherein conventional spectrometers use either gratings or prisms as a dispersing means. A basic spectrometer will further consist of many mirror coatings, gratings, and detector options to provide the necessary flexibility.

There are expensive research instruments which have the spectral resolution, range, and signal-to-noise ratios (SNR) to perform useful discriminations. These systems, are expensive, difficult to operate, unreliable and not suited to field operations. Furthermore, data is generally processed off-line by highly trained personal and, is thus, not quickly available.

Other available instruments are less expensive and have limited near real-time and real-time discrimination capabilities. Their focal planes (whether intensified or unintensified) and optics do not provide adequate SNR and optical performance to do economically valuable tasks. There is a third class of instruments which are a variety of imaging spectrometers generally marketed for chemical applications. These instruments are inexpensive but of poor optical imaging quality and contain inappropriate hardware and no software for any type of terrestrial imaging.

Most airborne imaging spectrometers use a reflection or transmission grating for the dispersive element because the gratings have linear dispersions as a function of wavelength, whereas prism spectrometers have a non-linear dispersion that is sensitive to changes in operational conditions such as altitude, temperature, and humidity. Thus, prism spectrometers are typically more sensitive to climatic changes, thereby resulting in poorer data quality as compared to grating spectrometers, unless continuous, real-time calibrations are performed.

Several alternate spectrometer configurations and techniques have begun to emerge in recent years including multiplexing of the signals from a large number of entrance and exit slits to overcome the limited field-of-view and lower optical efficiency of the single slit spectrometer. Other advances in spectrometers involve the dispersion and separate coding of various portions of a spectrum in the focal plane of the spectrometer. After this is accomplished, the radiation is guided back through the dispersing system and reassembled and focused on a single detector. Spectral information is then recovered using frequency spectrum extraction techniques.

Other examples of current systems include the use of acousto-optic tunable filters (AOTF) which operate from the ultra-violet to the infra-red regions of the optical spectrum. In general, an acoustic transducer and an acoustic absorber are bonded to opposite ends of an acoustic-to-optic crystal. The transducer converts a high frequency rf signal into a pressure wave which then propagates laterally through the acoustic-to-optic crystal. The resulting frequency of the standing waves act as a tunable grating to disperse the incoming energy into spectral components. The absorber then eliminates any acoustic reflections which would corrupt the primary rf signal. The AOTF technology is typically utilized in micro applications such as imaging a cross section of human epithelia cells as disclosed in U.S. Pat. No. 5,528,368 to Lewis et al. ("Spectroscopic Imaging Device Employing Imaging Quality Spectral Filters").

A macro spectrographic application for geographic surveys and similar applications is disclosed in U.S. Pat. No. 5,371,358 to Chang et al. wherein an improvement to an optical image assembly is shown. The improvement comprises a method for absolute radiometric calibration during data acquisition for a spectrographic detector array. The array is arranged in a matrix of rows and columns comprising a first and second linear detector array proximate to a first and second column of detector arrays, respectively. A cover for deflecting light from the first linear array in order to establish a dark current reference level is provided. Illumination is then provided from a calibrated light source to the second linear array. In this manner a sequential sampling of the detected output of the linear arrays are temporarily calibrated by the associated sensor elements in the linear detector arrays.

U.S. Pat. No. 5,475,212 to Nelson et al. discloses a "wavelength domain scanned imaging" spectrometer. This spectrometer is quite different from a typical CCD spectrometer in that beams of different wavelengths are simultaneously scanned across an area detector, and line readouts are synchronized to provide images at the different wavelengths. In a CCD spectrograph, also known as a "time domain image" spectrometer, an image is scanned across a CCD and the line shift and readout of the area CCD are synchronized with the rate of image motion. This spectrometer requires a very stable line of sight as spatial-spectral mixing occurs when the field of view moves in any direction other than along the velocity vector of the flight platform.

Currently, none of the disclosed systems provide the necessary combination of high image quality along with operational robustness and flexibility needed to perform extended surveillance and monitoring studies in the field. Further, present geographic systems have a tendency to use large pixel focal planes which by nature require a high dispersion grating and associated long focal length optics that results in instruments with large physical dimensions and correspondingly large weight. This leads to a requirement for larger, higher performance aircraft platforms as well as associated higher operating costs. The above systems also use custom built optics, cooled focal planes, software oriented to off-line data processing and expensive digital recorders which translate into very high cost, reliability problems and operational complexity.

SUMMARY OF THE INVENTION

It is therefore an object of the present invention to provide a compact, low cost, high quality spectrometer whose imaging performance exceeds commercial general purpose units.

It is a further object of the present invention to provide a high image quality spectrometer with transmission or reflection gratings using high quality refractive optics having a number of anti-reflection coated elements.

It is a further object of the present invention to provide a spectrometer that utilizes a primary spectral range that covers (spans) the visible and near-infrared region.

It is a further object of the present invention to provide a spectrometer having a digital focal plane made up of very small picture elements (pixels) wherein each spectral band is concentrated on a single pixel.

It is a further object of the present invention to provide a light weight unit that facilitates integration in a broad variety of carrier platforms.

It is a further object of the present invention to provide a spectrometer employing a very low dispersion grating along with a short focal length (refractive) optic.

It is a further object of the present invention to provide a spectrometer having a high signal-to-noise ratio (SNR).

It is a further object of the present invention to provide a spectrometer having a low dispersion design using part of the focal plane thereby increasing the system frame rate.

It is a further object of the present invention to provide a spectrometer having a means to greatly reduce aircraft platform induced roll motion effects in the incoming optical radiation before that data is processed by the spectrometer and related processing and recording system.

It is a further object of the present invention to provide a spectrometer having a means to examine output data in near real-time and real-time.

It is a further object of the present invention to use a low cost high speed hard drive for digital data recording to provide both random access simultaneous record and playback of the data and significantly lower cost.

It is a further object of the present invention to provide a spectrometer having gyro stabilization for sensor pointing and, a differential GPS system to provide accurate pixel geo-location on the surface of the earth along the width of the actual sensor swath as that swath is projected onto the ground.

It is a further object of the present invention to provide a spectrometer having a high accuracy timing signal, derived from a GPS receiver, to synchronize the imagery data for high precision geolocation.

It is a further object of the present invention to provide real-time spectral analysis of areas of interest.

It is a further object of the present invention to provide rapid processing of spectral data to classify ground objects.

It is a further object of the present invention to rapidly update the spectral data base used in the classification of ground targets in real-time.

It is a further object of the present invention to process the spectral data in ways to identify anomalous areas, whose spectral characteristics were originally unknown at the start to the processing algorithms.

These and other objects and advantages of the present invention will be apparent to those persons skilled in the art upon examination of the detailed description of the invention, the drawing figures, and the appended claims.

Research imaging spectrometers have shown that there is significant spectral variability in natural and manmade materials which can be exploited provided the spectrometer system provides the proper spectral resolution, spectral range, number of bands, and SNR. Powerful spectral discrimination algorithms such linear demixing and matched filtering have been developed to classify a pixel using a known, or data derived, set of spectral templates. These techniques have been found to be quite amenable to computer assisted, fully automated pixel identification and classification.

The "HyperSpectral Imaging Method and Apparatus" ("the present invention") is contemplated for use in digital imagery analysis systems. The present invention comprises several sensors and GPS position data to achieve near real-time and real-time target detection, verification, geolocation, and analysis. The present invention also provides in-flight verification and assessment for applications that do not require near real-time response, such as agricultural applications.

The present invention utilizes a primary spectral region in the visible and near-infrared. High quality refractive optics and a number of anti-reflection coated elements which provide high image quality are used. This results in a compact, low cost, high quality spectrometer whose imaging performance exceeds commercial general purpose units. The present invention can also be rapidly configured to another spectral region within the visible-near infrared by replacing order sorting filters to read a different region of the focal plane; and different gratings for increased spectral dispersion for specific applications. The present invention can also be used in other spectral regions such as the SWIR (short wave infrared) by use of a different focal plane and optics.

The present invention further uses small picture elements (pixels) on a digital focal plane. This design employs a low dispersion grating along the short focal length (refractive) optics so that each spectral band is concentrated in a single pixel. This translates into a high SNR which enables the processing speed of the present invention to increase. The unusually low dispersion design uses only a part of the focal plane which allows the system frame rate to also be increased since only part of the focal plane is read.

The present invention further comprises a rate gyro with a roll stabilized mirror and drive. The roll rate from the rate gyro is integrated into a roll angle in a digital signal processor (DSP). To keep the sensor pointing in the desired position a roll angle dependent damping term is used to keep the roll angle near zero when not in bank. The output from the rate gyro is fed into a low pass filter and integrated before being used to drive a mirror holder. This mechanism removes platform roll induced motion effects from the data.

The spectrometer of the present invention is adjusted for a certain focal length and data is input into a Real-Time Processor ("RTP") computer. The RTP computer comprises special software, a PCI digital interface board and DSP processor board(s) directly linked to the spectrometer focal plane. The software of the present invention provides an interactive interface and a means to manipulate the data received from the spectrometer.

Connected to the RTP computer is a monitor, one or more hard disk drives, and GPS receivers and antennas. The disk drive(s) store data that is recovered from the present invention and allows fast access to the data for analysis, since simultaneous random access reading and writing (of the data) can be analyzed as it is being recorded. The monitor allows the user to examine the data in near real-time and real-time.

The GPS receivers and antennas link the present invention to a GPS system. The GPS system is then used to determine the deviation from a flight path over a desired target line. An error signal, generated from a GPS calculation, is added to a stabilizer to provide off nadir sensor pointing to acquire stabilized imagery over the desired flight line, e.g., "target path stabilization." A high accuracy 1 Hz timing signal from the GPS receiver is also used to phase lock a timer used to trigger the spectrometer digital focal plane and a digital camera at a precise time. This allows the imagery and GPS position data to be synchronized allowing for high precision geolocation.

The present invention also comprises three lenses all having a certain focal length and aperture speed. A slit holder and dual lens adapter is attached between the first lens and the second lens. Attached between the second lens and the third lens is a grating holder and lens coupler. An order block filter is placed within or attached to the grating holder and lens coupler. A CCD Camera is attached to the third camera lens.

It is the goal of the present invention to create a complete hyperspectral remote sensing system primarily for airborne application. As such, a high signal to noise ratio, with a useful but not excessive spectral range and resolution are achieved through the use of high performance digital focal planes, carefully optimized spectrometer optics, high efficiency diffraction gratings and highly speed optimized software. Commercial off the shelf technology is employed to ensure both low cost (an order of magnitude cheaper than current research instruments) and robust and simple operation, which is necessary for real world fielding of this technology.

Applications for the present invention include (i) agricultural applications such as early detection of pest infestations, diseases and precision farming, (ii) ecological applications such as vegetation typing, surveys, monitoring of pollution, early leak and spill detection and illegal foresting, (iii) geological applications such as mineral detection and identification, (iv) archeological applications such as detection of underground ruins, roads and ancient drainage patterns by subtle variations in the overlying vegetation, (v) military application and law enforcement applications such as the detection of materials of interest such as camouflage, tenting materials, paints, the detection of illegal economic activities and settlements, and the detection of objects which are shallowly buried or submerged. For example the hyperspectral sensor of the present invention need only sense a single pixel of camouflage paint to make the detection, and the processor needs only to do certain type matches of that pixel's spectrum against a small known set. Practice has shown that this is both computationally easier and more robust, (vi) oceanography and commercial fishing applications such as mapping of surface vegetation types and detection and identification of objects or animals in shallow water, including fish and phytoplankton, and (vii) disaster and emergency applications such as near and real-time disaster monitoring, and search and rescue (e.g. such a system could search out large areas of ocean for a single anomalous pixel which could correspond to a survivor's clothes or small debris). The present invention may also be used for medical applications such as diagnosis of skin conditions and associated anomalies. In this last case the GPS sub system is not required.

DETAILED DESCRIPTION

Figure 1:
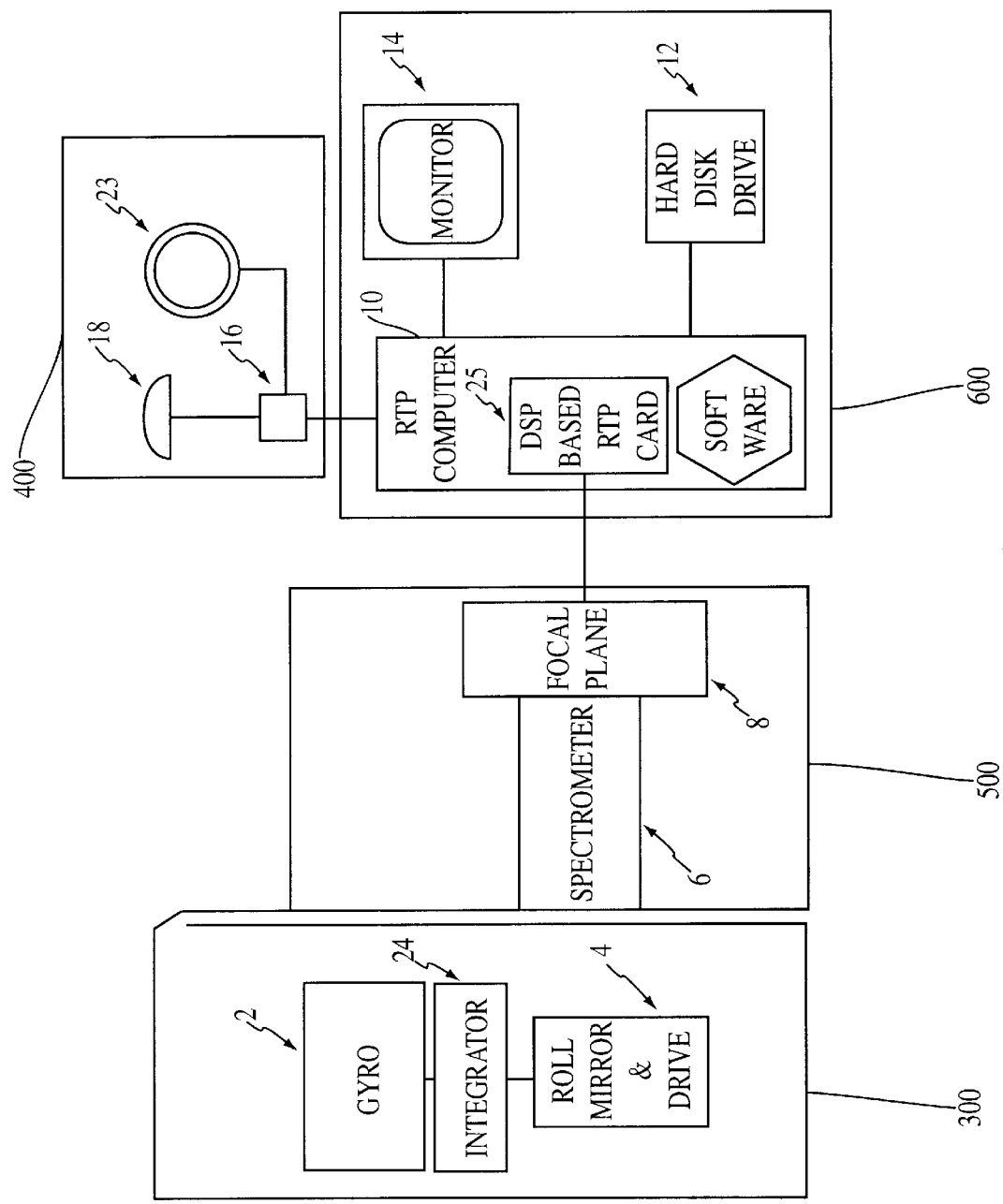
FIG. 1 is a system block diagram of the present invention.

FIG. 1 illustrates a system block diagram of the present invention. This system comprises four primary subsystems including (i) a roll stabilization and pointing sub-system 300, (ii) a differential GPS sub-system (DGPS) 400, (iii) an imaging spectrometer sub-system 500, and (iv) a processing subsystem 600.

The roll stabilization and pointing subsystem 300 senses aircraft roll attitude and positions a high speed mirror 4, controlled by a gyro 2 as part of the sensor head. The function of the gyro 2 is to sense deviations in roll of the aircraft platform from level flight and, by commanding the position of a stabilization mirror, keep the spectrometer field-of-view (FOV) accurately pointed independent of aircraft roll position over an optical FOV of substantially ±30 degrees. The subsystem also secures inputs from the DGPS subsystem to repoint the sensor FOV to compensate for errors in aircraft flight path position as well as errors in flight path heading.

The DGPS sub-system 400 accurately computes the position of the aircraft collection platform, in latitude and longitude (and in other coordinate systems such as UTM), and (i) provides this data for display to an operator on a moving map display on a monitor, (ii) feeds this data to the roll stabilization pointing subsystem 300 to correct for flight path errors, (iii) records this data for geo-registering each pixel of data collected by the imaging spectrometer system and (iv) provides accurate, GPS based, timing signals to the DSP processor 25 to synchronize data capture, thereby maximizing location accuracy of each image data pixel.

The imaging spectrometer subsystem 500 breaks each pixel along a narrow strip of spatial pixels that are aligned cross-track (i.e. perpendicular) to the forward motion of the aircraft, into individual spectra and presents these optical signals to the CCD focal plane 8 for conversion into electrical signals usable by the processing subsystem.

The processing subsystem 600 receives inputs from the imaging spectrometer subsystem 500 and performs mathematical operations to detect (i) preselected materials (ii) small, unique spectral differences in a scene or (iii) anomalous materials in a scene. These discrimination images, along with the raw spectral data, are presented to an operator via a monitor 14 and recorded on a digital hard disk drive 12 along with accurate aircraft position information from the DGPS subsystem 400. The processing subsystem 600 also compares flight track information from the pre-stored flight plan with actual flight path information from the DGPS subsystem 400 to generate FOV pointing commands to the roll stabilization and pointing subsystem 300. The processing subsystem 600 also permits playback and capture of all data previously recorded during flight for non-real-time analysis; either by an imbedded real-time processor or by other custom or commercial analysis software.

Roll Stabilization Sub-System

The roll stabilization sub-system 300 comprises a rate gyro 2 which measures aircraft platform roll rate and outputs a proportional voltage. This output voltage is fed to an integrator circuit 2a that integrates this rate data and outputs instantaneous, absolute, platform roll angle which is fed to a roll correction drive 4. This roll angle is corrected for by repositioning the roll stabilization mirror 4 so that the sensor FOV moves in an equal but opposite direction. The output roll rate angle is added to a computer command roll angle which is derived from GPS and target position information. The appropriate gain is applied to drive the mirrors mechanical position to half the aircraft roll angle; this corresponds to the full optical FOV angle. This is because the optical angles are doubled through the roll stabilization mirror 4.

Low pass filtering is applied to the roll angle data in order to remove high frequency jitter from the imagery. This operation removes any roll induced motion effects from the data prior to being admitted into the spectrometer, the computer or the recorder so that no reprocessing of the data is required to compensate for in-flight FOV instability. This compensation keeps the sensor FOV accurately pointed along the intended nominal aircraft flight line. A damping term is used to keep the roll angle biased toward zero when the aircraft is in level flight, i.e., not in a bank (turn).

The aircraft flies the distance on the ground of a projected width of a slit in one frame time. This is based on the fore-optics focal length, the slit width, and the frame rate. This adjustment is thereafter input into a real-time processor (RTP) 10. As an example, for a one milliradian (1/1000 radian) slit width the optimum aircraft speed is h/1000*t, so that for an aircraft altitude of 3000 meters and a frame rate of 1/60 second, the aircraft speed is 3000*60/1000=180 meters/second.

Differential Global Positioning Satellite Sub-System

A GPS receiver 16 and antenna(s) 18 link the present system to the GPS satellite system 23 and, as necessary, to a differential correction signal provided by either (i) the U.S. Coast Guard system, (ii) an FM sub-carrier system, (iii) a satellite correction system or (iv) a local GPS base station.

A high accuracy 1 Hz timing signal from the GPS receiver 16 is also used to phase lock a timer used to trigger acquisition of frames from the digital focal plane of the imaging spectrometer at a precise time. This allows the hyperspectral imagery and GPS position data to be synchronized allowing for high precision geolocation of the hyperspectral data.

In order to accomplish the desired synchronization, the DSP card 25, which controls the digital focal plane, is provided with an internal timer that triggers the hyperspectral camera at a periodic rate. The computer 10 obtains an estimate of the GPS time (i.e. within one second) and sets the DSP timer to this value. The time difference between the accurate 1 Hz signal from the GPS receiver 16 is compared to the DSP timer. The difference in timers is driven to zero by either speeding up or slowing down the DSP timer. The synchronization between the DSP timer and GPS Receiver 16 enables each frame to be "tagged" with an accurately known GPS time allowing for accurate geolocation of each frame. A further explanation of the DSP timer is provided below.

Imaging Spectrometer Sub-System

Figure 2:
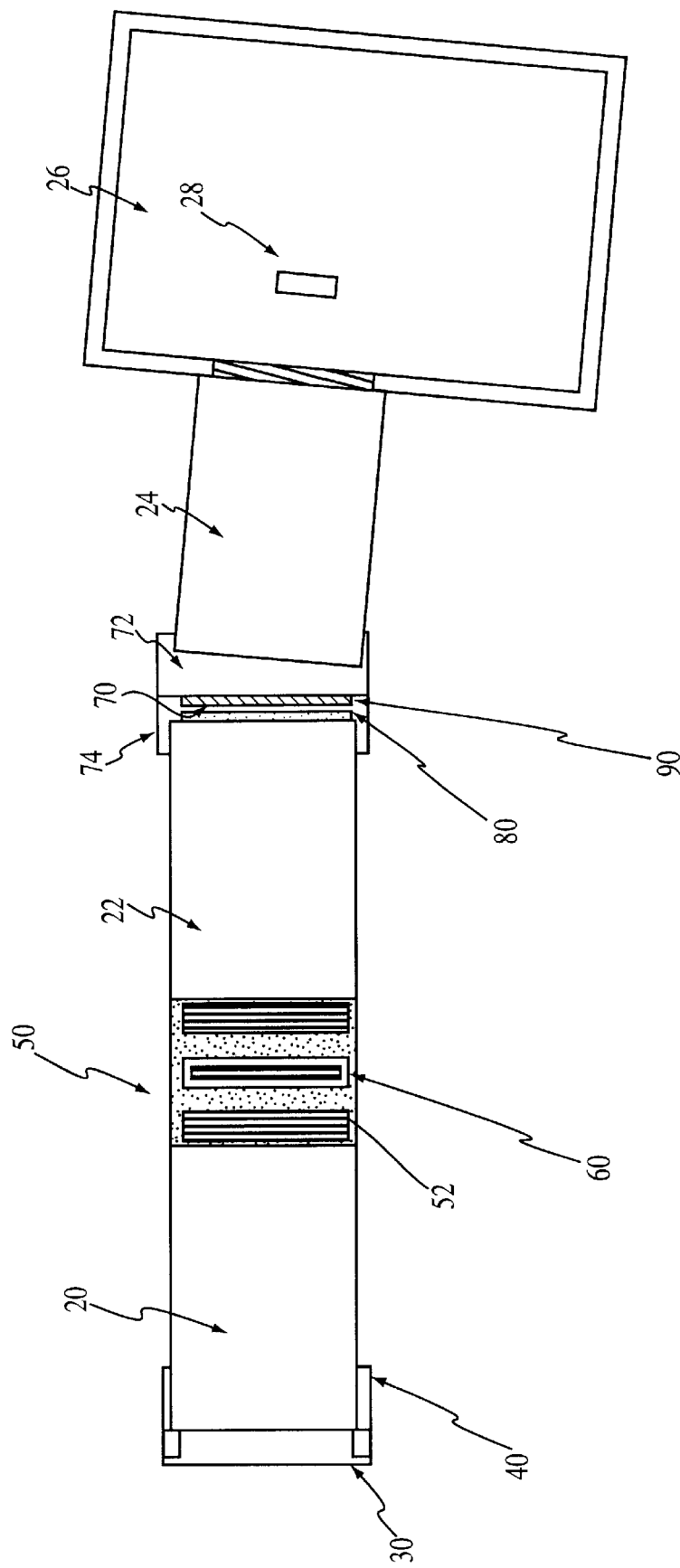
FIG. 2 is an imaging spectrometer including a CCD Camera.

FIG. 2 illustrates a sensor head having a CCD Camera 26 along with three lenses defined as a first lens 20, a second lens 22, and a third lens 24. Each lens has a first end and a second end.

A filter holder 30 and a filter 40 (e.g. lens adapter) are attached to the first end of the first lens 20. A slit holder 50 and dual lens adapter 52 are attached between the second end of the first lens 20 and the first end of the second lens 22. A slit 60 is placed within the slit holder 50. In the preferred embodiment, the slit 60 has a width of substantially 17 microns. In an alternative embodiment, the slit 60 can be translated and rotated so that (i) its image fills the entire extent of the focal plane, (ii) aligns along a single column of detectors on the focal plane, and (iii) a specific spectral line falls on a prescribed single column of detectors.

The first lens 20 projects an image of the scene being viewed onto the slit 60. The slit 60 allows only a long, very narrow strip of the image which is formed by the first lens, 20 to pass through the slit 60. The diverging light passing through the slit 60 is collimated or made to exit the second lens 22; to a degree set by the length and width of the slit 60 and the focal length of the second lens 22. Lateral adjustment (perpendicular to the length of the slit) of the slit 60 may be required to accurately position a single spectral wavelength on a specific column of detectors on the focal plane. Angular adjustments of the slit 60 may also be required to align the length of the image strip, at a particular wavelength passing through the slit 60, with a specific column of detector elements on the focal plane array. These same angular adjustments also align the length of the image strip parallel to the columns of detector elements on the plane array.

Attached between the second end of the second lens 22 and the first end of the third lens 24 are a filter holder 74, a grating holder 70, and a lens coupler 72. An order block filter 80 is placed within the filter holder 74. Placed directly behind the order blocking filter 80 is a transmission diffraction grating 90. The diffraction grating 90 manipulates the collimated part of the image that is passing through the slit 60 and second lens 22 and disperses the 'strip' image into its spectral components. The only critical alignment of the diffraction grating 90 is rotation in order to position the spectra from one element of the scene onto a single row of detectors in the focal plane. In the preferred embodiment, the diffraction grating 90 has a value of approximately 150 grooves/mm.

The order block filter acts to block any second order energy, from the blue end of the spectrum, from mixing with the IR energy from the first order spectrum. That is, the collimated strip of the scene passes through the order blocking filter 80 to remove that part of the spectrum that could interfere with the image and result in an ambiguous signal output of the focal plane.

In the preferred embodiment the optical axis of the third lens 24 is rotated approximately 5.6 degrees in the same direction as dispersion provided by the transmission diffraction grating 90. This enables the third lens 24 to intercept the beam diffracted by the diffraction grating 90 over the primary spectral region of interest while minimizing the extent over which the third lens 24 must operate to image the primary spectral region of primary interest. The optical magnification provided by the combination of the second lens 22 and the third lens 24 is the ratio of the focal length of the third lens 24 divided by the focal length of the second lens 22. This ratio enables the combination of second lens 22 and the third lens 24 to produce a magnification of the slit 60 on the focal plane. The third lens 24 images a two dimensional image onto the focal plane (e.g. one axis is spatial and one axis is spectral) for conversion into an electronic signal. Referring back to FIG. 1, this electronic signal is processed by the real-time processor in the computer 10 and displayed to the operator on the monitor 14 while being recorded to the hard disk drive 12 for off line, non-real-time, processing.

Returning to FIG. 2, the CCD Camera 26, is attached to the second end of the third lens 24 and is co-axial with the optical axis of the second lens. In the preferred embodiment, the focal plane is rotated approximately 5.6 degrees sideways from the center line of the first lens 20 and second lens 22 to refocus the collimated light from the second lens. The CCD Camera 26 has lens 24 of a certain focal length, preferably 35 mm with a 150 grove/mm transmission diffraction grating. The focal length of the lens 24 is optimized to project the spectra over a region on the focal plane comprising only half of the spatial extent of the focal plane in order to maximize overall system frame rate.

In the preferred embodiment the first lens 20 includes a focal length of approximately 17 mm and is operated at a photographic aperture of f/4. The second lens 22 has a focal length of approximately 35 mm and is operated at a photographic aperture of between f/4 and f/1.9. The third lens 24 has a focal length of approximately 35 mm and is operated at a photographic aperture of f/1.9. Other focal lengths and apertures are contemplated and are within the scope of the present invention. In addition, operation of the present invention at other spectral regions with different spectral resolution and with a corresponding variance in grating dispersions, percentage of focal plane used and other system parameters is also contemplated and is within the scope of the present invention.

By removing the order blocking filter 80 and calibrating the present invention with a monochromator, it is possible to extend the range of the grating spectrometer to over an octave. This can extend the operating range to the useful range of silicon 400–1000 or more.

CALIBRATION OF THE PRESENT INVENTION FOR INCREASED SPECIAL RANGE

In order to calibrate the imaging spectrometer in the "increased spectral range" mode, the spectrometer of the present invention is illuminated with light in the 400–500 nm range and the response is measured in both the first and second orders. Spectra obtained from the spectrometer is then corrected by taking the 400–500 nm range of the spectra multiplying by the second order over the first order ratios and subtracting from the 800–1000 nm spectral data therefrom. This allows for an increased spectral range of the spectrometer of the present invention.

Figure 3:
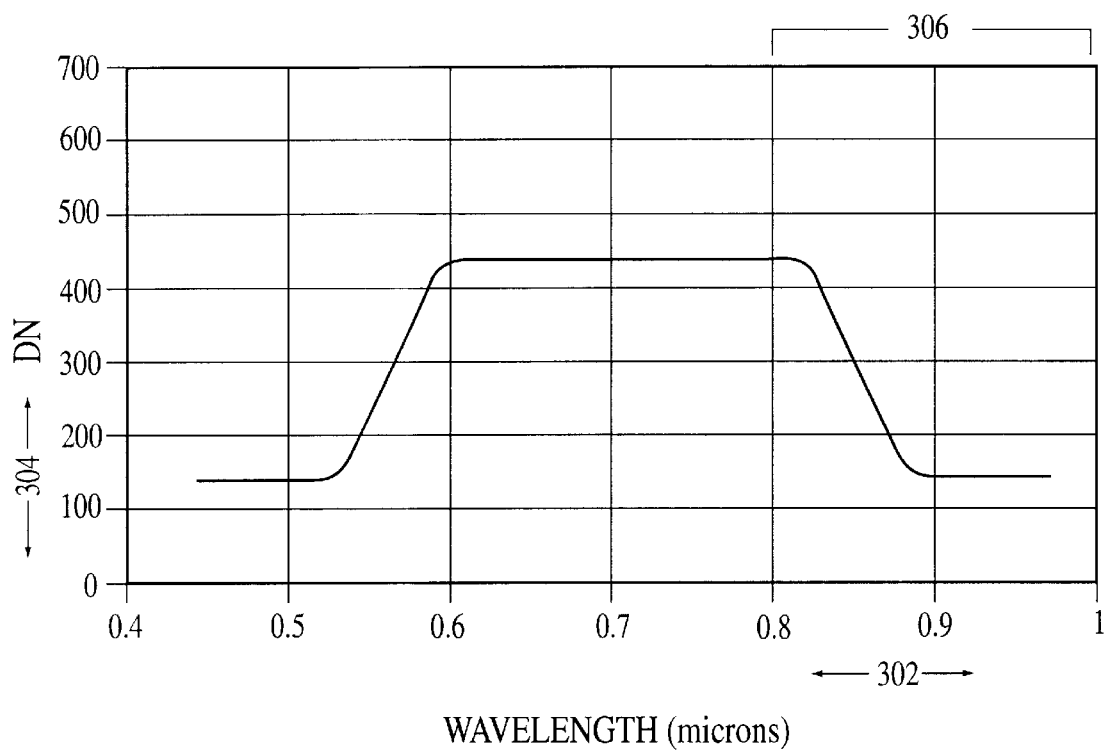
FIG. 3 is a graph measuring raw spectrometer output.

FIG. 3 shows a graph measuring raw spectrometer output having first and second orders where the "x" coordinate represents wavelength measured in microns 302 and the "y" coordinate represents uncalibrated spectral radiance, presented as digital counts (DN) 304. The raw output is channel number along the "x" coordinate which is converted to wavelength and raw ADC (analog to digital converter) output along the "y" coordinate. A typical output range for a 10 bit ADC is 0 to 1023 DN. These values are the voltages measured at each of the sampled CCD pixel locations. This voltage is proportional to the intensity of light hitting the pixels with a constant of proportionality that is related to both wavelength and spatial location.

In order to calibrate out instrument effects, the present invention estimates the strength of the second order curve from the short wave end of the first order curve and subtracts that estimate from the corrupted long wave end to increase the usable spectral range. This provides an uncorrupted hyperspectral image.

As seen in FIG. 3, the second order curve corrupts the spectra from approximately 0.8 to 1.0 microns 306. The second order energy corresponds with 0.4 to 0.5 microns which is accurately measured in the first order and is subtracted from the composite spectra yielding an uncorrupted first order spectra between 0.4 and 0.5 microns. By knowing the second to first sensitivity in digital counts from 0.4 to 0.5 microns and multiplying that response by the first order measured response, an accurate estimate of the second order response is obtained. This is subtracted from the raw data to yield an accurate estimate of the first order only response. Thus, by estimating the strength of the second order response from the short wave end of the first order curve and subtracting it from the corrupted long wave end, the usable spectral range is increased.

As way of example, a target is measured by assuming a 400 to 1000 nm system with a monochromator or other (low energy outside of passband) source in the 400 to 500 nm range. Measuring the response yields the following results:

| nm | digital count |
|---|---|
| 500 | 150 |
| 800 | 10 |
| 900 | 6 |
| 1000 | 3 |

It is noted that the response in the 800 to 1000 nm range to a 400 to 500 nm energy source is significantly less due to low grating efficiency in the second order and twice the dispersion. This responsive curve is accomplished by using blazing techniques on the gratings which makes the spectrometer of the present invention extremely efficient in the first order (and inefficient in the second order).

Measuring a reference spectra in the 400 to 1000 nm range yields the following results:

| nm | digital count |
|---|---|
| 400 | 160 |
| 450 | 165 |
| 500 | 180 |
| 600 | 220 |
| 700 | 150 |
| 800 | 60 |
| 900 | 70 |
| 1000 | 23 |

This data is corrupted by the second order at 800 nm and beyond. Using the above mentioned procedure, however, the corrupted data can be transformed into uncorrupted data. The following is an example of the calculations used to obtain the uncorrupted data beyond the 800 nm range:

| nm | digital count |
|---|---|
| 800 | 60 − 10/200*160 = 52 |
| 900 | 70 − 6/180*165 = 64 |
| 1000 | 23 − 3/150*180 = 19 | where 60, 70, and 23 are the digital count from a reference spectra measured from the 800 to 1000 nm range (using a 100 increment step); 10, 6, and 3 are the digital count as measured from a target in a 800 to 1000 nm system with a monochromator or other (low energy outside of passband) source in the 400 to 500 nm range (using a 100 nm incremental step); 200, 180, and 150 are the digital count as measured from a 400 to 600 nm system with a monochromator or other (low energy outside of passband) source in the 400 to 500 nm range (using a 100 nm incremental step); and 160, 165, and 180 are the digital count in from a reference spectra measured in the 400 to 500 nm range (using a 50 nm incremental step).

The above example described a means for removing second order energy from the measurements, the inverse process is also used in the present invention. In this case, the second order energy is added to the reference spectra of targets of interest, and this corrupted target spectra is then compared with the incoming spectra. This is computationally faster than having to remove the second order from each incoming spectra.

Real-time Processing Sub-System

The real-time processing sub-system comprises hardware elements as well as software and algorithmic elements.

HARDWARE

As referenced in FIG. 1, the RTP computer 10 comprises a DSP based RTP card or cards 25 for capturing digital imagery linked to the spectrometer 6. Connected to the RTP computer 10 is a monitor 14, at least one high speed hard disk drive 12, GPS receiver(s) 16 and antenna(s) 18. The disk drive 12 stores data that is recovered from the spectrometer 6 and also provides RAM Playback and simultaneous record and playback capabilities. The monitor 14 allows the user to the examine the output in near real-time or real-time.

SOFTWARE

In order to achieve near real-time and real-time target detection, verification, geolocation, and analysis software is provided. This software also provides in flight verification and assessment for applications that do not require near real-time response. This software comprises handling, preprocessing, and buffering capabilities preferably residing on one or more DSP real-time processors as well as user interactive capabilities residing in the Windows 95/NT environment. The real-time processor contains at least 16 MB of RAM in order to buffer the raw hyperspectral and discrimination imagery data to the host PC which is running with the inherently non real-time Windows 95/NT operating system.

Spectrographic Software Residing on a DSP Real-Time Processor

The software comprises handling, preprocessing, and buffering capabilities preferably residing on one or more DSP real-time processors. More specifically, the software of the present invention is responsible for handling continuous high data rate (e.g., 28 Mb/sec or greater) hyperspectral data, preprocessing the rate down, and thereafter buffering the data. The nominal raw hyperspectral data rate with a typical focal plane can be approximately 28 MHz and is reduced by the real-time processor by the following means:

1. Only part of the focal plane is read which allows the system frame rate to increase;
2. The data is binned spatially so that every other pixel will be aggregated in the software, or if time does not permit, the aggregation is ignored completely; and
3. 10 bit data streams are compressed or truncated to 8 bits by clipping or table lookup if insufficient processing or recording rates exist for a given system configuration.

This process reduces the data rate to approximately the 3 to 4 MHz range which allows direct recording by a host PC configured with a compatible high speed SCSI hard drive system. The software of the present invention also performs discrimination processing on the data in real-time using simple vector operations such as linear demixing, matched filtering, and spectral angle mapping. Additionally, by downloading different vectors and applying different computationally fast operations at the end of the sequence, several other processing techniques, such as linear unmixing, principle/canonical components, angle space techniques, and matched filtering can be utilized.

Figure 4:
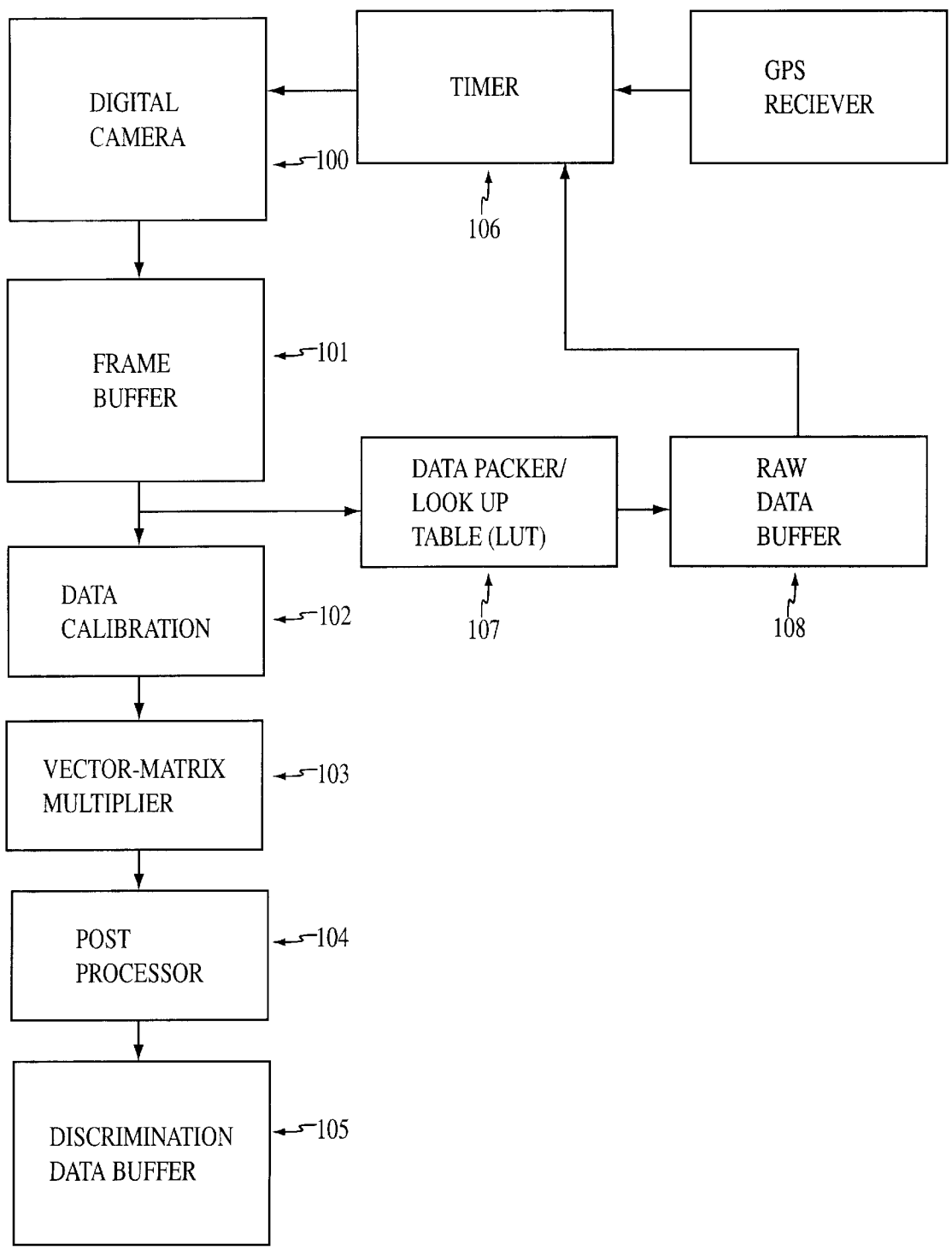
FIG. 4 is a block diagram for the real-time processor.

FIG. 4 is a block diagram of the spectrographic software residing on the DSP real-time processor. A digital camera 100 images a desired target area and a frame buffer 101 temporarily stores the incoming data, typically a 10 bit data stream. It is preferable that the frame buffer 101 only store the part of the frame of the digital camera 100 that is of interest to the user. Thus, the frame buffer 101 does not store an entire frame of the digital camera 100.

A data calibrator 102 receives buffered data from the frame buffer 101. Once the buffered data is received, the data calibrator 102 provides a dark-field and a whitefield correction to the incoming data stream. The data calibrator solves the equation $$C=(R-B)/(W-B)$$

where C is the calibrated spectral measurement, R is the raw spectral measurement, B is a black field, and W is a white field (or an estimate of a white field).

In alternate embodiments, the present invention skips the above step or uses simplified calibration techniques (depending on the particular processing implementation as explained in further detail below). One such technique utilizes discriminant vectors derived from calibrated spectra remapped back into the instrument space by the inverse equation $$R=C*(W-B)+B$$

where C is the calibrated spectral measurement, R is the raw spectral measurement, B is a black field and W is a white field (or an estimate of a white field). A single black value instead of a different value for each pixel can also be applied if there is insufficient processing power and memory access speed on the real-time processor.

Each incoming data stream (e.g. vector) from the data calibrator 102 is then multiplied by a vector-matrix multiplier 103, e.g., a Win95/NT based user interface supplied matrix. Depending on the values of the matrix, various operations can be performed including (i) linear unmixing; (ii) matched filter; (iii) spectral angle determination; (iv) intensity computation; and (v) principal components.

A post processor 104 obtains the discrimination values from the vector-matrix multiplier 103 and allows various computations to be performed on the incoming data. These computations include, but are not limited to, (i) gain adjustments; (ii) thresholding; and (iii) display largest only. Since the Win95/NT is not a real-time operating system, a discrimination data buffer 105 is provided. The discrimination data buffer 105 stores discrimination data in memory so that the Win95/NT based interface does not have to respond immediately to the incoming data from the post-processor 104. The DSP board(s) is capable of responding predictably to events with microsecond type latencies and buffering (e.g. storing) the data for use by the non real-time system.

A timer 106 controls the triggering of the digital camera 100 and sets the system frame rate, nominally at 60 Hz. The user interface sends a rough estimate of the GPS time to the timer 106 so that it is initially set near the GPS time. As previously noted, the GPS receiver 16 (as shown in FIG. 1) sends a high accuracy 1 Hz timing signal to the DSP board which causes an interrupt at 1 Hz and triggers the digital camera 100 at a periodic rate. At each interrupt, a 1 second modulus of the timer 106 is computed and the time difference between the accurate 1 Hz signal from the GPS receiver 16 is compared to the DSP timer. In this manner, the timer 106 is driven to zero by either speeding up or slowing down the DSP timer for synchronization with the GPS time. The synchronization between the DSP timer and GPS Receiver 16 enables each frame to be "tagged" with an accurately known GPS time allowing for accurate geolocation of each frame.

A data packer/look up table 107 is also provided by the present invention. The data stream, preferably a 10 bit data stream, runs through the data packer/look up table 107 in cases where it is desirable to reduce the data from its 10 bit fidelity. For instance the data packer/look up table 107 is capable of clipping the image, log compression and other similar operations. The 10 bit data can also be grouped into three 10 bit values per a double word for full fidelity.

A raw data buffer 108 receives and stores raw spectral data from the timer 106 and the data packer/look up table 107. Like the discrimination data buffer 105, the raw data buffer 108 stores the data in memory so that the Wm95/NT based interface does not have to respond immediately to the incoming data from the post-processor 104. The raw data buffer 108 is much larger in size than the discrimination data buffer 105 and has a short header which contains the GPS time value at the instant the image was taken.

Interactive User Software Running on a Non Real-Time Windows 95/NT Environment

The software of the represent invention also comprises user interface capabilities preferably running in a Windows 95/NT environment. The user interface capabilities of the present software comprise interactive windows which fuse hyperspectral and GPS data (e.g. frame tagging) and display, record, analyze, and play back the data in near real-time or real-time. These interactive windows include (i) a main window; (ii) a focal plane image display window; (iii) a spectral display window; (iv) a discriminant developer window; (v) a discrimination display window; and (vi) a GPS moving map display window.

Figure 5:
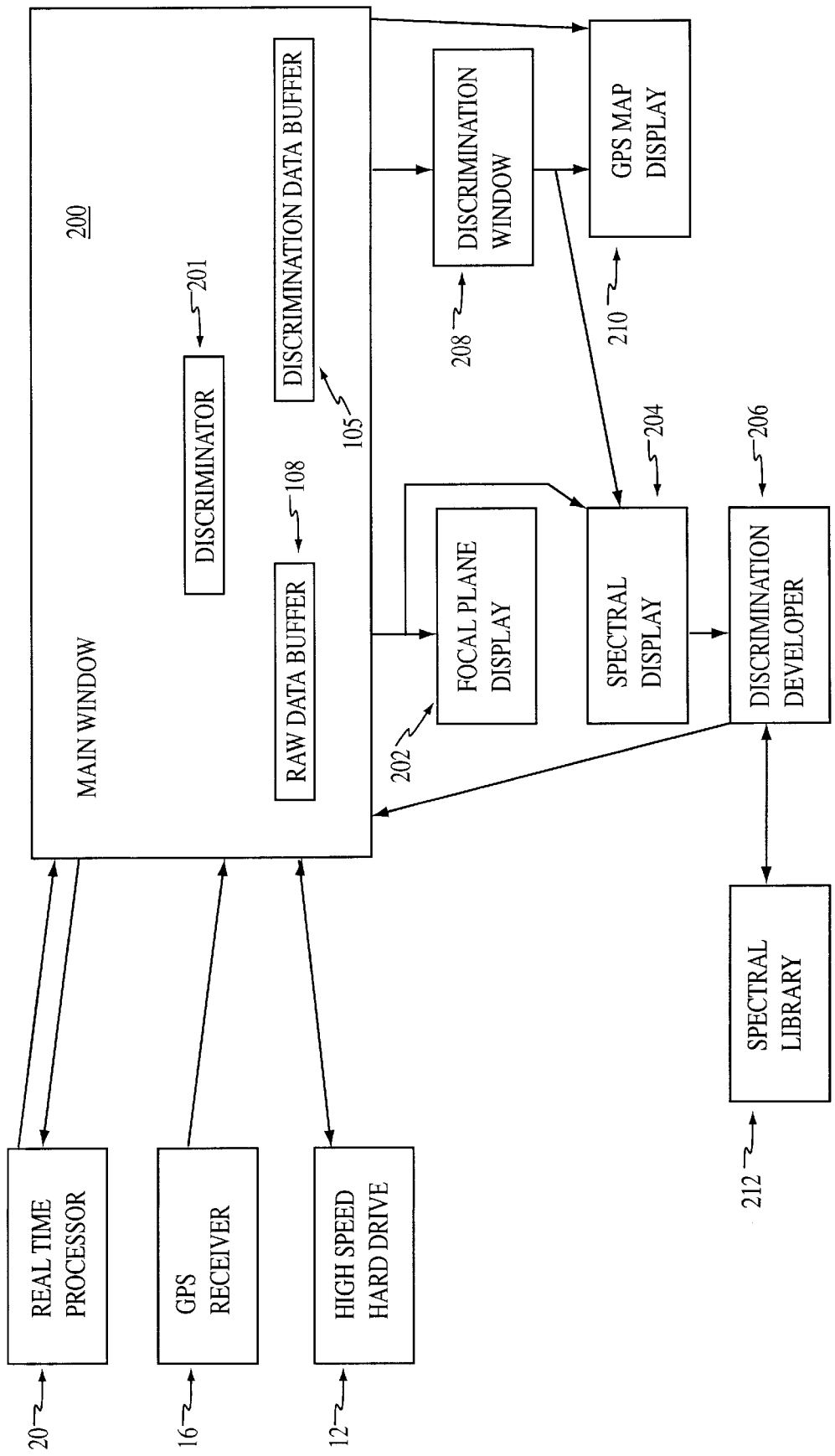
FIG. 5 is a block diagram of the user interface software.

FIG. 5 illustrates a block diagram of the user interface software program utilizing the above interactive windows. A main window 200 interfaces with the Real Time Processor (RTP) 10, GPS receiver 16, and at least one high speed hard drive 12. The main window 200 is responsible for controlling hyperspectral imaging (HSI) and GPS data records. The raw data buffer 108 the discrimination data buffer 105, and a discriminator 201 are provided in the main window 200. As previously stated, the raw data buffer 108 stores hyperspectral data for recording to the hard disk 12 and the discrimination buffer 105 stores and displays hyperspectral data for recording to the hard disk 12. The discriminator 201 performs simple real-time processing and is capable of testing algorithms on data that has been recorded to the hard disk 12 or when the RTP 1 is not available. The main window 200 also interfaces to child windows as explained below.

A focal plane display 202 captures and displays the raw data, e.g., raw focal plane images, from the main window 200 and calibrates and assesses the state of the system. That is, the focal plane display 202 aligns and calibrates the spectrometer of the present invention. Computer assisted alignment procedures based on real-time determination of absorption minima and emission maxima are envisioned.

A spectral display window 204 also captures raw image from the incoming HSI imagery of the main window 200 and played back imagery from the hard disk 12 or from a spectral library 212 which is stored on the hard disk 12. The spectral display window 204 displays only the spectra from regions sampled in the discrimination imagery. This allows operator confirmation of targets and generation of discriminants with the help of a discriminant developer 206.

The discriminant developer 206 retrieves and displays spectra obtained from the incoming data stream from the spectral display window 204 and the spectral library 212. The discriminant developer 206 also computes matrices to solve well known hyperspectral discrimination techniques such as linear least squares, matched filtering, and principal components to name but a few. Additionally, the discriminant developer 206 computes and selects post processing parameters such as threshold levels and cluster size in order for target and anomaly detection to be performed automatically. Thereafter, these discriminant parameters are transmitted to the main window 200 which, in turn, are routed to the RTP 1 and a discrimination window 208. It is this process that enables the user to rapidly and interactively development these discriminants with both incoming and stored data and apply it to the RTP 1.

The discrimination window 208 displays the incoming discrimination data from the main window 200 as it is received in real-time or playback. The discrimination window 208 also flags and attempts to identify targets when the automatic target detection is enabled. The discrimination window 208 also freezes the display and transmits the precise location, e.g. latitude, longitude, and spectrum, of the mouse position within the image for display by the main window 200. At this point, the discrimination window 208 saves the current display in industry standard Hyperspectral data formats.

A GPS map display window 210 displays a map with the current airborne heading and location. This information is retrieved from both the main window 200 and the discrimination window 208. Superimposed from this information is a track history of where the aircraft has been. Selection of a point on the track history extracts the corresponding HSI imagery by translating the known time to find the imagery. The GPS map display window 210 also transmits the latitudinal and longitudinal mouse position to the main window 200 for display. Preferably, the HSI discrimination data, the latitude, and longitude are displayed to substantially 10's of meter accuracy's in a variety of coordinate systems (e.g. WGS-84, NAD27, UTM, lat/lon, etc.). Moreover, the GPS map display window 210 sends the GPS time of the mouse position if it is near the aircraft ground track and allows the HSI imagery of that location to be recalled in near real-time.

Imaging Techniques

The following sections serve to illustrate how two of the most powerful hyperspectral discrimination techniques share many computational similarities and are readily implementable by processing hardware which is optimized for vector multiplication, i.e. DSP processors. These techniques also provide an example of how spectra may be transformed to instrument space to speed up processing by excluding several of the steps for complete realtime data calibration.

Several powerful hyperspectral discrimination techniques have at their core a vector multiple of the incoming pixel spectra and some type of discrimination vector. These discrimination vectors are typically chosen among one or more expected background spectral templates and one or more target spectral templates. For example, vegetation, soil and camouflage is a common choice for military search applications. Each pixel is matched against these templates and is identified by the discriminator with the largest value. Two of the most powerful discriminators are linear least squares and matched filtering.

Least Squares Technique

In least squares technique each pixel is modeled by the following equation.

$$P = S_{CAMO}\, a_{CAMO} + S_{SOIL}\, a_{SOIL} + S_{VEG}\, a_{VEG} + N$$

where P is a pixel with n spectral bands, $S_{CAMO}$, $S_{SOIL}$ and $S_{VEG}$ are the spectra in instrument space (as would be seen by the instrument) and $a_{CAMO}$, $a_{SOIL}$ and $a_{VEG}$ are the template strengths. N is the noise vector with mean 0 and covariance matrix K (which is due to instrument errors, atmospheric/illumination errors and unmodeled scene variations). For example, flying over a pure pixel of camouflage would give $S_{CAMO}=1$ and $S_{SOIL}=S_{VEG}=0$. In vector form, this is $$P = Sa + N$$

where a is obtained by well known linear least squares techniques which thus yields $$a = (S^T K^{-1} S)^T S^T P$$

It is important to note that $(S^T K^{-1} S)^T S^T$ is a matrix which is precomputed once the desired target and background spectra are determined. The computationally intensive step is a matrix (several vectors) multiply which is well suited to solution by dedicated DSPs.

Matched Filtering Techniques

In matched filtering, the incoming spectra P are simply multiplied by the template spectra and largest vector product is utilized. That is, $$b = [S_{CAMO}\ S_{SOIL}\ S_{VEG}] P$$

where b is a 3 element vector. Note in this case that the S vectors need to be all of the same length (i.e. they need to be normalized). The $[S_{CAMO}\ S_{SOIL}\ S_{VEG}]$ is a precomputed matrix and is suitable to computation by DSPs.

Choice of Template Vectors

In order to utilize the above equations they must be consistent in terms of coordinate system. If the incoming spectra are calibrated, then the template spectra must also be calibrated spectra. But the full calibration process (dark level, whitefield, atmospheric and order overlap corrections) takes a great deal of computing power. It is possible to skip many of these steps by taking the calibrated template spectra and applying the inverse operations (as explained above) wherever possible and, thus, work with partially uncalibrated input spectra. Depending on the accuracy required, it may be possible to eliminate some or nearly all of the calibration steps.

Anomaly Detection

It is important for a surveillance system to identify, locate and characterize areas in the scene where spectral data is significantly different from what was expected (anomalous to expectation) during a search operation. For example, these areas may contain additional background elements that need to be characterized and unmixed to improve system detection performance or unknown targets such as camouflage nets that appear to be natural backgrounds but have characteristics different than the surrounding scene as determined by the sensors.

This anomaly detection is performed by applying a variety of analytical means such as spectral template strength coefficients. These coefficients are derived in the real-time processor during unmixing and can be used to reconstruct an expected spectrum from which a "Chi square ($X^2$) error image" can be computed. The value of the total error accumulated across all spectral channels, for each spatial pixel, is mathematically computed using:

$$X^2 = \sum_{k=1}^{n} [Mi, j, k - M'i, j, k]^2$$

where X (Chi) is rms error in the spectral fit between the measured Mi,j,k and the reconstructed spectral values, M'i,j,k; i is the spatial coordinate across the slit; j is spatial coordinate along the flight direction and perpendicular to the length of the slit; k is the spectral coordinate, perpendicular to both spatial axes; and n is the number of spectral estimates for each spatial pixel. These values are then compared with a predetermined threshold value obtained from analysis of the scene data and a pass/fail decision is thereafter declared resulting in identification of an anomalous pixel.

Anomalous pixels can also be detected by calculating those pixel's template strength coefficients, derived in the real-time processor during linear unmixing, that have template strengths which are significantly divergent from those expected. For example, a large negative value or template strength greater than one generally corresponds to areas in the scene which are poorly modeled and hence may be significant. In these cases the spectra of the "anomalous pixels" are extracted and saved or, alternatively, automatically incorporated into the demixing process or more elaborate techniques such as the above mentioned Chi-squared test. Geographic coordinates for each pixel or the spatial centroid of clusters of pixels are then determined and stored and/or reported in the RTP. This provides the ability for the system to "learn," resulting in the detection of new, unexpected elements in a scene, that have large potential value to the user.

Preferred and alternate embodiments of the present invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the invention, be apparent to persons of ordinary skill in the art.

What is claimed is:

1. A hyperspectral imaging spectrometer for providing accurately geo-referenced hyperspectral digital imagery in near realtime and realtime comprising:
   (a) a processing subsystem;
   (b) an imaging spectrometer subsystem having a field of view (FOV) adapted to provide spectral characteristic information to the processing subsystem;
   (c) a roll stabilization and pointing subsystem adapted to provide aircraft stabilization information to the processing subsystem to align the hyperspectral imaging spectrometer above a desired target area, where the roll stabilization and pointing subsystem comprises:
      a high speed mirror controlled by a gyro adapted to sense deviations in aircraft roll; and
   (d) a differential GPS subsystem adapted to provide positional and geosynchronic data to the processing subsystem.

2. The hyperspectral imaging spectrometer of claim 1, wherein the high speed mirror controlled by the gyro roll is adapted to keep the imaging spectrometer subsystem FOV accurately pointed independent of aircraft roll position over an optical field-of-view.

3. The hyperspectral imaging spectrometer of claim 1, wherein the roll stabilization and pointing sub-system is adapted to receive inputs from the differential GPS subsystem to repoint the imaging spectrometer subsystem FOV, thereby compensating for errors in aircraft flight path position and heading.

4. The hyperspectral imaging spectrometer of claim 1, wherein the differential GPS subsystem is adapted to compute the position of an aircraft collection platform and to provide display data to an operator.

5. The hyperspectral imaging spectrometer of claim 1, wherein the differential GPS subsystem is adapted to correct flight path errors, thereby aligning the received spectral characteristic information within the hyperspectral imaging spectrometer.

6. The hyperspectral imaging spectrometer of claim 1, wherein the differential GPS subsystem is adapted to geo-register at least one pixel of data collected by the hyperspectral imaging spectrometer.

7. The hyperspectral imaging spectrometer of claim 1, wherein the differential GPS subsystem is adapted to provide accurate GPS based timing signals to the processing subsystem to synchronize data capture to maximize location accuracy of at least one image data pixel.

8. The hyperspectral imaging spectrometer of claim 1, wherein the imaging spectrometer subsystem is adapted to break a plurality of pixels along a narrow strip of spatial pixels into individual spectra.

9. The hyperspectral imaging spectrometer of claim 1, wherein the imaging spectrometer subsystem is adapted to present optical signals to a CCD focal plane for conversion into electrical signals usable by the processing subsystem.

10. The hyperspectral imaging spectrometer of claim 1, wherein the processing subsystem is adapted to detect spectral differences in a scene.

11. The hyperspectral imaging spectrometer of claim 1, wherein the processing subsystem is adapted to compare flight track information from a pre-stored flight plan with imaging spectrometer FOV from the differential GPS subsystem thereby generating imaging spectrometer FOV pointing commands to the roll stabilization and pointing subsystem.

12. The hyperspectral imaging spectrometer of claim 1, wherein the processing subsystem is adapted to playback and capture data previously recorded during flight for non-real-time analysis.

13. The hyperspectral imaging spectrometer of claim 1, wherein the roll stabilization subsystem comprises:
   (a) a rate gyro adapted to measure and record aircraft platform roll rate;
   (b) an integrator circuit adapted to integrate the data received from the rate gyro; and
   (c) a roll rate angle correction drive adapted to receive information from the integrator circuit thereby adjusting aircraft platform roll angles.

14. The hyperspectral imaging spectrometer of claim 13, wherein the roll angle is adapted to correct roll stabilization by repositioning a roll stabilization mirror thereby moving the imaging spectrometer subsystem FOV in an equal but opposite direction.

15. The hyperspectral imaging spectrometer of claim 13, wherein the roll stabilization and pointing subsystem further comprising low pass filtering which is applied to the roll angle thereby removing high frequency jitter from the spectral characteristic information.

16. The hyperspectral imaging spectrometer of claim 13, wherein the roll stabilization and pointing subsystem further comprising a damping term thereby keeping the roll angle biased toward zero when the aircraft is in level flight.

17. The hyperspectral imaging spectrometer of claim 1, wherein the differential GPS subsystem comprises:
   (a) a GPS receiver;
   (b) a GPS antenna; and
   (c) a GPS satellite system linked between the GPS receiver and GPS antenna.

18. The hyperspectral imaging spectrometer of claim 1 further comprising a differential correction signal to enhance the capabilities of the differential GPS subsystem.

19. The hyperspectral imaging spectrometer of claim 1, wherein the imaging spectrometer subsystem comprises:
   (a) a first lens having a first end and a second end;
   (b) a second lens having a first end and a second end, the first end of the second lens is coupled to the second end of the first lens;
   (c) a third lens having a first end and a second end, the first end of the third lens is coupled to the second end of the second lens; and
   (d) a CCD Camera having a focal plane coupled to the second end of the third lens.

* * * * *